United States Patent Office 3,280,329
Patented Oct. 18, 1966

3,280,329
PROCESS FOR CONTROLLING THERMAL NEUTRON CONCENTRATION IN AN IRRADIATED SYSTEM
David E. Harmer, Midland, Mich., and Lyle B. Borst, Ossining, N.Y., assignors to The Dow Chemical Company, Midland, Mich., a corporation of Delaware
No Drawing. Filed Aug. 8, 1962, Ser. No. 215,499
3 Claims. (Cl. 250—106)

This invention relates to an improvement in irradiation processes and more particularly is concerned with an improved process for controlling the concentration of unwanted thermal neutrons in a system being irradiated especially by radiation energy emanating directly from the core of a nuclear reactor.

Irradiation, as by high energy ionizing gamma radiation, is extremely useful for promoting the processing and reactions of a wide variety of chemicals, polymers, drugs, etc. One readily available, economical source of such high energy radiation is a nuclear reactor. However, such reactors do not produce the desired gamma radiation alone, but provide mixtures consisting essentially of ionizing gamma radiation and undesirable neutrons. Thermalization of the neutrons in these mixtures in turn leads to their absorption by any of a wide variety of materials being processed. In many cases these neutrons induce undesirable nuclear changes in isotopes present in the system being irradiated whereby a long-lived undesirable and potentially dangerous build-up of residual induced radioactivity results in the system.

Heretofore the use of radiation energy from a nuclear reactor has been accompanied by difficulties and problems. For example, if sufficient neutron shielding material is included between the reactor core and system being irradiated to absorb or block the neutrons from contacting the system, the intensity of the desired ionizing radiation received by the system is reduced by a detrimentally large factor. On the other hand, if the neutron shielding material placed between the reactor core and system being treated is thin enough to allow a considerable portion of the gamma radiation to pass therethrough, a troublesome amount of neutron flux simultaneously escapes into the process system.

The difficulties and problems inherent in the use of a nuclear reactor or other high energy source, whereby mixtures of high energy ionizing radiation and neutrons are produced, now essentially have been eliminated by the present process whereby substantially all of the thermalized neutrons in an irradiated system are removed before they can react with isotopes in the system and thereby lead to the production of unwanted radioactive species.

It is a principal object of the present invention to provide an improved radiation process utilizing gamma radiation energy from a fission process wherein there is substantially complete removal of undesirable neutrons without having undue absorption of the gamma radiation energy.

This and other objects and advantages will become apparent from the detailed description presented hereinafter.

In accordance with the improved process of the present invention, a neutron absorbing material is dispersed in relation to a system being irradiated by a high energy ionizing radiation source as to effectively absorb, or scavenge, thermalized neutrons transmitted to or generated in the system. Conveniently the neutron absorber is scattered throughout, within or adjacent the system being irradiated.

In actual operation of the present process a radiation source, such as a nuclear reactor which generates mixtures of ionizing gamma radiation and neutrons or an electron accelerator, for example, is provided. A system to be irradiated is placed so as to receive high energy radiation from the source; this system is provided with a sufficient amount of a neutron absorber ordinarily dispersed in spaced apart relation throughout the system so as to absorb undesirable quantities of thermal neutrons which may be found in the system during irradiation. The so-prepared system is subjected to the high energy radiation thereby to bring about effective, predetermined irradiation of the system.

The amount of dispersed neutron absorber to be employed in a given system is dependent on the total amount of undesirable thermal neutrons transmitted to or generated in the system upon irradiation, the degree of neutron scavenging desired and the cross-section of the particular neutron absorber employed.

For a given system, the actual concentration and positioning of neutron absorber used is determined by the level of induced radioactivity, from isotope changes because of neutron absorption, that can be tolerated in the irradiated system, the neutron cross-section of the particular absorber employed and the neutron cross-section of the material being processed. The minimum weight of neutron absorber can be exceedingly small, e.g. as low as $2 \times 10^{-5}$ weight percent based on the weight of the charge being irradiated. Ordinarily, the weight of the absorber ranges from about 0.01 to about 10 percent or more of the charge weight.

The actual arrangement of the neutron absorber in the system being irradiated is such that in the competition for thermal neutrons between the products, reactants or articles being irradiated in the system and the special neutron absorber of the instant invention is such that absorption by the absorber is overwhelmingly favored.

For any given system the preferred amount and distribution of absorber required to meet given specifications can be determined by one skilled in the art.

Materials suitable for use as thermal neutron absorbers in the present process are those containing a high cross-section for thermal neutron absorption but which are compatible with and dispersible throughout the system being irradiated. Generally, any element or separated isotope having a thermal neutron cross-section greater than that of chlorine (cross-section of $33.6 \pm 1.1$ barns) is operable in the present process. Particularly suitable neutron absorbers include, for example, lithium, boron, cobalt, rhodium, silver, cadmium, indium, neodymium, samarium, europium, gadolinium, terbium, dysprosium, holmium, erbium, thulium, ytterbium, lutetium, hafnium, rhenium, iridium, gold and mercury. Of these, boron (cross-section $755 \pm 20$ barns), cadmium (cross-section $2450 \pm 50$ barns), mercury (cross-section $380 \pm 20$ barns), gadolinium (cross-section $46,000 \pm 1,000$ barns), samarium (cross-section $5600 \pm 200$ barns), europium (cross-section $4300 \pm 100$ barns), dysprosium (cross-section $950 \pm 50$ barns), and iridium (cross-section $440 \pm 20$ barns) are particularly effective. The neutron absorbers, as employed in the instant process, can be in their elemental state or in a compound form. Also, these can be used along or as mixtures.

The neutron absorber, as dispersed, can be in any of a variety of forms depending upon the characteristics of the system being irradiated. For example, with certain articles, the neutron absorber can be in the form of a foil with which articles being irradiated are wrapped. For other systems, pellets, cylinders, granules, finely divided powders, rods, or a solution of the absorber in a suitable medium are other suitable forms of neutron absorber which can be employed in the present improved process.

Conveniently, in carrying out the process, a neutron reflector, moderator and/or shield which is thin enough to allow most of the ionizing radiation to pass through, but which absorbs and reflects part of the neutrons can be positioned between the reactor and the special neutron absorber containing the system being treated. With such a modification, a lower concentration of the dispersed neutron absorber in the system can be employed. Also, if desired in this latter embodiment additional neutron absorber can be incorporated directly into the shielding system. For example, when a highly hydrogenous shield material such as water is employed, sodium tetraborate ($Na_2B_4O_7$) can be dispersed, i.e., dissolved directly in this shield, thereby effectively stopping a large percentage of neutrons from passing on into the system being irradiated.

However even with the interspaced shielding and reflecting agents as are presently used, a number of thermal and epithermal neutrons still ordinarily manage to enter the irradiation zone along with the desired gamma radiation. Without the special absorber employed as disclosed for the present process the epithermal neutrons would be slowed to a thermal level and these along with the other thermal neutrons then be absorbed by the materials of the system bringing about nuclear isotope changes therein. The presence of the special neutron absorber, in the system being irradiated not only serves to preferentially absorb the thermal neutrons passed into the irradiated zone, but also removes those slowed down within the system before they can be absorbed by the system.

Although the instant improved process particularly is applicable for scavenging or absorbing undesirable neutrons from a radiation source having mixed energy products, the present method also is applicable to situations in which neutron activity is induced in materials through high energy ionizing radiation. To illustrate, 10 mev. energy electrons, as from an electron accelerator, can produce a reaction in deuterium having a 2.221 mev. threshold for photo neutrons yielding such neutrons as one of the products. To prevent these neutrons from activating surrounding materials in a detrimental manner, the high energy electron irradiation process can be carried out in accordance with the instant process wherein a neutron absorber as described hereinbefore can be dispersed throughout the system being irradiated. With this novel improvement, the safe upper working level of radiation devices, such as the electron accelerator, which are widely used for radiation processing can be markedly extended.

The following examples will serve further to illustrate the present invention but are not meant to limit it thereto.

*Example 1*

A pharmaceutical drug having a sulphur containing compound as a constituent and contained in glass vials is sterilized employing an ionizing radiation sterilization dose of about 6 megarads. In this process, the drug is sealed in glass vials of light flint glass (nominal composition of glass $SiO_2$—53.9%, $Na_2O$—1.0%, $K_2O$—7.6%, $As_2O_3$—0.3%, $CaO$—2.0%, $PbO$—35.2%).

The vials are positioned in the path of radiation directed from the reactor. Small vials of gadolinium metal are spaced apart randomly or regularly among the glass vials of drugs. The total weight of gadolinium metal employed is about 10 percent of the glass present in the charge. A neutron shield of about 20 centimeter thick layer of water and about 0.1 centimeter cadmium sheet adjacent the container holding the water is positioned between the reactor and the vials. The cadmium layer is on the side of the tank nearest the vials. With such an assembly, the resulting gamma radiation energy emerging from the water-cadmium shield is about 50 percent of that fed from the reactor core into this shield and the neutron flux level reaching the vials is about 10 percent of that emanating from the reactor core.

The predetermined dose of radiation is transmitted to the vials. Following the run, analysis indicates a residual induced radioactivity in the glass vials well within a safe, low handling and storage level.

In a similar run carried out without employing the dispersed gadolinium neutron absorber, a high, relatively long-lived radioactivity stemming from formation of radioactive isotopes of sulphur is found in the vials.

*Example 2*

In another drug sterilization process carried out similarly to that described for Example 1, except the drug is sealed in vials of borosilicate crown glass (nominal composition $SiO_2$—64.2%, $Na_2O$—9.4%, $K_2O$—8.3%, $B_2O_3$—11.0%, $BaO$—6.1%, $As_2O_3$—0.4% and $CaO$—1.0%), and the dispersed vials of gadolinium are eliminated from the system. The presence of the boron values in the glass used directly in the system being irradiated reduced the induced radioactivity present in the irradiated vials to a safe, low level.

*Example 3*

Fabricated polyethylene articles, having about 20–25 parts per million iron as the chief impurity having an effective cross-section, are wrapped in a 0.2 millimeter thick cadmium foil in the form of a 2 inch diameter cylinder and of sufficient length to cover the articles and subjected to ionizing radiation from a nuclear reactor to cross-link the polyethylene material. The total weight of cadmium employed is about 13 weight percent of the polyethylene weight in the charge.

For the processing, 50 megarads of ionizing radiation is passed through a shield similar to that described in Example 1. The resulting gamma radiataion emerging from the shield and fed to the polyethylene charge is about 25 megarads. The neutron flux, as in Example 1, is about 10% of that fed into the shield.

The resulting cross-linked polyethylene articles give no undesirable induced residual radioactivity.

If these samples are reacted without the cadmium foil wrapping, the neutron flux transmitted to the system reacts with the iron impurity transforming this into the relatively long-lived radioactive isotope, $Fe_{55}$, of half-life 29 years thereby rendering these articles dangerous to handle and use.

*Example 4*

The process as described for Example 3 is carried out except that none of the polyethylene articles are wrapped in cadmium foil. Rather, small rods of cadmium, about 0.2 millimeter in diameter and about 10 millimeters long are scattered throughout the articles to be irradiated. These cadmium rods, on a weight basis, are equivalent to about 0.1 percent of the total polyethylene charge.

The polyethylene articles upon irradiation as described in Example 3, again give no undesirable induced residual radioactivity.

*Example 5*

A stream of bromotrichloromethane and one of ethylene, wherein the ethylene is present in excess are passed continuously through a reaction zone in the presence of ionizing radiation from a nuclear reactor to prepare 1-bromo, 3-trichloropropane. For this process, finely divided boric acid anhydride, i.e. the boric acid ($H_3BO_4$) of commerce, is added continuously to the reactor to provide a concentration of boron oxide neutron absorber of about 10% based on the weight of bromotrichloromethane in said reactor at a given time, suspended in the reactor zone.

Ionizing radiation about 0.1 megarad, is passed through a shield similar to that described for Example 1.

As the product is removed from the reactor zone, the boron oxide is filtered therefrom and recycled back to the reactor zone.

The resulting 1-bromo, 3-trichloropropane has a desirably low induced radioactivity level.

Various modifications can be made in the present invention without departing from the spirit or scope thereof, for it is understood that we limit ourselves only as defined with appended claims.

We claim:

1. In a radiation process wherein a system is being irradiated by a mixture of high energy ionizing gamma radiation and neutrons the improvement which comprises: dispersing a neutron absorbing material in spaced apart relation throughout said system being irradiated, said neutron absorber being present in an amount of at least 0.01 percent by weight of the weight of said system being irradiated, and said neutron absorber having a thermal cross-section of at least about 400 barns, arranging said neutron absorbing material throughout said system such that in the competition for thermal neutrons between the system being irradiated and said neutrol absorbing material absorption of said thermal neutrons by said neutron absorbing material is overwhelmingly favored, subjecting the so-prepared system to said mixture of high energy ionizing gamma radiation and neutrons thereby to bring about effective predetermined irradiation of said system, and absorbing by said neutron absorbing material undesirable quantities of thermal neutrons present in said system during said irradiation.

2. In a radiation process wherein a system is being irradiated with a mixture of high energy ionizing gamma radiataion and neutrons emanating from a nuclear reactor core the improvement which comprises: dispersing a neutron absorbing material in spaced apart relation throughout the system being irradiated said neutron absorbing material being compatible with said system being irradiated, said neutron absorber being present in an amount of at least about 0.1 percent by weight of the weight of said system being irradiated, said neutrol absorber being a member selected from the group consisting of elemental boron, cadmium, mercury, gadolinium, samarium, europium, dysprosium, iridium, compounds containing said members and mixtures of said elemental members and compounds containing said members, irradiating said system with high energy ionizing gamma radiation and neutrons emanating from said nuclear reactor core, and removing substantially all of the thermalized neutrons from the irradiated system without undue absorption of said gamma radiation energy by said neutron absorbing material before said thermalized neutrons can react with isotopes in said system to produce unwanted radioactive species.

3. In a radiation process wherein a system is being irradiataed with a mixture of high energy ionizing gamma radiation and neutrons emanating from a nuclear reactor core the improvement which comprises: dispersing vials of gadolinium throughout the system being irradiated, said gadolinium being present in an amount of at least 0.02 percent by weight of the weight of said system being irradiated, irradiating said system with high energy ionizing gamma radiation and neutrons emanating from said nuclear reactor core, and removing substantially all of the thermalized neutrons from the irradiated system without undue absorption of said gamma radiation energy by said gadolinium before said thermalized neutrons can react with the isotopes in said system during said irradiation.

References Cited by the Examiner

UNITED STATES PATENTS

| | | | |
|---|---|---|---|
| 2,743,226 | 4/1956 | Newson | 176—15 |
| 2,950,393 | 8/1960 | Southward | 250—108 |
| 2,961,415 | 11/1960 | Alexral | 250—106 |
| 2,990,350 | 6/1961 | Natkin | 250—106 |
| 3,016,463 | 1/1962 | Needham | 250—106 |
| 3,089,957 | 5/1963 | Bishay | 250—83 |
| 3,106,535 | 10/1963 | Blanco | 250—108 |
| 3,124,687 | 3/1964 | Barton | 250—44 |

RALPH G. NILSON, *Primary Examiner.*

JAMES W. LAWRENCE, *Examiner.*

S. ELBAUM, *Assistant Examiner.*